United States Patent
Kabasawa et al.

(10) Patent No.: US 9,490,661 B2
(45) Date of Patent: Nov. 8, 2016

(54) UNINTERRUPTIBLE POWER SUPPLY

(71) Applicant: FDK CORPORATION, Minato-ku, Tokyo (JP)

(72) Inventors: Takashi Kabasawa, Tokyo (JP); Jinichi Sakamoto, Tokyo (JP)

(73) Assignee: FDK CORPORATION, Minato-ku, Tokyo (JP)

( * ) Notice: Subject to any disclaimer, the term of this patent is extended or adjusted under 35 U.S.C. 154(b) by 427 days.

(21) Appl. No.: 14/137,836

(22) Filed: Dec. 20, 2013

(65) Prior Publication Data
US 2014/0183959 A1    Jul. 3, 2014

(30) Foreign Application Priority Data

Dec. 27, 2012    (JP) .................................. 2012-284074

(51) Int. Cl.
*H02J 9/00*    (2006.01)
*H02J 9/06*    (2006.01)
*H02M 1/00*    (2006.01)

(52) U.S. Cl.
CPC ....... *H02J 9/061* (2013.01); *H02M 2001/0032* (2013.01); *Y02B 70/16* (2013.01); *Y10T 307/625* (2015.04)

(58) Field of Classification Search
CPC ............. H02J 9/061; Y10T 307/625; H02M 2001/0032; Y02B 70/16
USPC .................................................... 307/64–66
See application file for complete search history.

(56) References Cited

U.S. PATENT DOCUMENTS

| | | | |
|---|---|---|---|
| 4,401,895 | A | 8/1983 | Petkovsek |
| 5,894,413 | A | 4/1999 | Ferguson |
| 2005/0121979 | A1 | 6/2005 | Matsumoto et al. |
| 2011/0010568 | A1 | 1/2011 | Kageyama et al. |

FOREIGN PATENT DOCUMENTS

| | | |
|---|---|---|
| CN | 2715411 Y | 8/2005 |
| JP | 10-019943 | 1/1998 |
| JP | 2001-013175 A | 1/2001 |
| JP | 2006-126135 A | 5/2006 |
| JP | 2007-225427 A | 9/2007 |

OTHER PUBLICATIONS

European Search Report issued on Feb. 28, 2014 by European Patent Office in European Patent Application No. 13196926.
Texas Instruments, "2.25 MHz 400-mA Step Down Converter With Selectable VOUT", Jan. 1, 2009, pp. 1-25, XP055103159. Retrieved from the Internet on Feb. 19, 2014: http://www.ti.com/lit/ds/symlink/tps62272.pdf.
Office Action for Japanese Patent Application No. 2012-284074, transmitted Jul. 29, 2016.

*Primary Examiner* — Hal Kaplan
(74) *Attorney, Agent, or Firm* — Marshall, Gerstein & Borun LLP

(57) ABSTRACT

An uninterruptible power supply is having a battery, a power inverter circuit for inverting the electrical power of the battery, and a voltage control circuit. The voltage control circuit controls the power inverter circuit, so that the output voltage of the power inverter circuit is maintained at a standby voltage lower than a rated voltage under the condition of a power failure detection signal being not output from an external power supply and the output voltage of the power inverter circuit equals the rated voltage under the condition of the power failure detection signal being output from the external power supply.

2 Claims, 2 Drawing Sheets

UNINTERRUPTIBLE POWER SUPPLY

BACKGROUND OF THE INVENTION

1. Field of the Invention

The present invention relates to an uninterruptible power supply.

2. Description of the Related Art

In an external power supply for converting the electricity of a commercial power source to electrical power having a predetermined voltage to supply the power to electronic equipment, the voltage of the electrical power supplied to the electronic equipment temporarily drops if an instantaneous power failure occurs in the commercial power source, thus possibly causing problems with the operation of the electronic equipment. For this reason, there has been a publicly-known uninterruptible power supply used to detect the instantaneous power failure in the commercial power source by a power failure detection signal output by the external power supply and supply electrical power from a backup battery or the like to the electronic equipment in case of an instantaneous power failure.

In general, a comparatively long time lag from the time an instantaneous power failure occurs to the time the external power supply outputs a power failure detection signal is in many cases associated with a general-purpose power failure detection circuit included in the external power supply as a standard feature. In addition, a conventional uninterruptible power supply starts up a converter circuit, an inverter circuit, and the like included therein only after detecting the power failure detection signal. This means that a certain period of time is required until the uninterruptible power supply is ready to supply electrical power having a rated voltage, from the time the power failure detection signal is detected. Accordingly, the uninterruptible power supply may fail to back up in time if electrical power supply from the commercial power source to the external power supply stops due to the instantaneous power failure, though there is more or less the time difference from when the instantaneous power failure occurs to when the output voltage of the external power supply drops. Consequently, the voltage of electrical power supplied to the electronic equipment may drop temporarily.

As a related art intended to solve such problems as described above, there has been publicly known a power failure detector or the like for rapidly detecting an instantaneous power failure in a commercial power source (see Japanese Patent Laid-Open Nos. 10-19943, 2001-13175, 2006-126135, and 2007-225427).

The power failure detector for rapidly detecting the instantaneous power failure in the commercial power source is generally complex in configuration and large in scale and requires great amounts of cost and time for development, however. The power failure detector is thus extremely expensive in many cases.

An object of the present invention, which has been accomplished in view of such circumstances as described above, is to provide an uninterruptible power supply, at low cost, in which the voltage of electrical power supplied to electronic equipment is less likely to drop temporarily even if an instantaneous power failure occurs in a commercial power source.

SUMMARY OF THE INVENTION

An aspect of the present invention is directed to an uninterruptible power supply having a battery; a power inverter circuit for inverting electrical power of the battery; and a voltage control circuit for controlling the power inverter circuit, so that output voltage of the power inverter circuit is maintained at a standby voltage lower than a rated voltage under a condition of a power failure detection signal being not output from an external power supply and the output voltage of the power inverter circuit equals the rated voltage under a condition of the power failure detection signal being output from the external power supply.

As described above, the power inverter circuit is controlled so that the output voltage of the power inverter circuit is maintained at the standby voltage lower than the rated voltage under the condition of a power failure detection signal being not output from the external power supply and the output voltage of the power inverter circuit equals the rated voltage when a power failure detection signal is output from the external power supply. Consequently, it is possible to greatly reduce the time difference from the time the power failure detection signal is detected to the time the uninterruptible power supply is ready to supply electrical power having the rated voltage. Accordingly, the possibility of the voltage of electrical power supplied to the electronic equipment dropping temporarily when an instantaneous power failure occurs in the commercial power source can be reduced without having to provide any expensive power failure detector.

In addition, the uninterruptible power supply maintains the output voltage of the power inverter circuit at the standby voltage lower than the rated voltage during standby. For this reason, the electrical power of the battery of the uninterruptible power supply is hardly consumed at all during the time electrical power is supplied from the external power supply to the electronic equipment at the rated voltage. Accordingly, there arises no such a situation that the electrical power of the battery is consumed during standby, thus failing to meet the essential requirement of supplying electrical power from the uninterruptible power supply at the time of an instantaneous power failure.

Thus, according to the present invention, there is obtained a working effect of being able to provide an uninterruptible power supply, at low cost, in which the voltage of electrical power supplied to the electronic equipment is less likely to drop temporarily at the time of an instantaneous power failure in the commercial power source.

BRIEF DESCRIPTION OF THE DRAWINGS

The present invention will become more fully understood from the detailed description given hereinafter and the accompanying drawings which are given by way of illustration only, and thus, are not limitative of the present invention, and wherein.

DETAILED DESCRIPTION OF THE INVENTION

Hereinafter, embodiments of the present invention will be described while referring to the accompanying drawings.

<Configuration of UPS 10>

The configuration of a UPS 10 serving as an "uninterruptible power supply" according to the present invention will be described while referring to FIG. 1.

Figure 1:
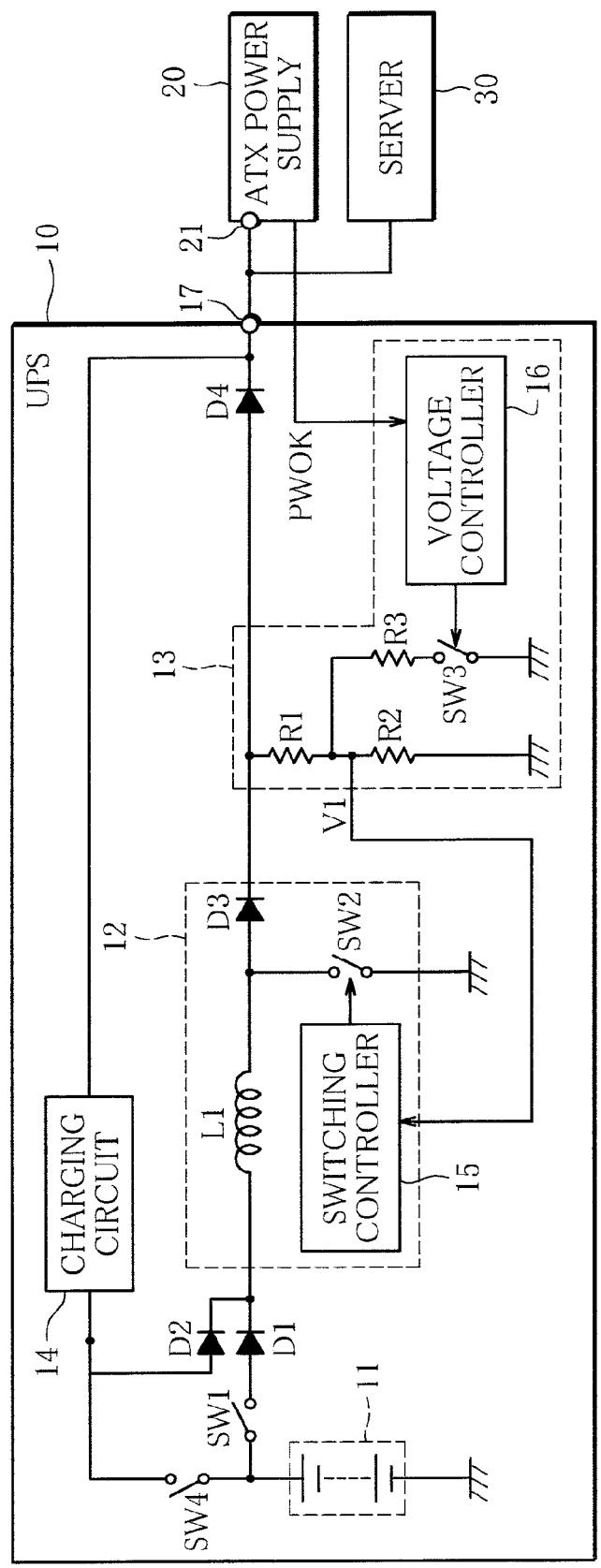
FIG. 1 is a block diagram of a UPS.

FIG. 1 is a block diagram of the UPS 10.

An ATX (Advanced Technology eXtended) power supply 20 serving as an "external power supply" is an apparatus which operates on electrical power supplied from a commercial power source and supplies DC power having a predetermined voltage to a server 30. The commonly-used ATX power supply 20 is provided with a general-purpose power failure detection circuit as a standard feature to output a power failure detection signal (PWOK, SMBALERT or the like) when the circuit detects a power failure in the commercial power source. The UPS 10 is an apparatus which supplies DC power having a predetermined voltage to the server 30 at the time of an instantaneous power failure in the commercial power source (not illustrated). The server 30 is connected to an output terminal 17 of the UPS 10 and an output terminal 21 of the ATX power supply 20.

The UPS 10 is provided with a battery 11, a step-up chopper circuit 12, a voltage control circuit 13, and a charging circuit 14.

The battery 11 is, for example, a rechargeable/dischargeable secondary battery, such as a nickel-hydrogen secondary battery. The positive electrode of the battery 11 is connected to one end of a switch SW1 and the negative electrode of the battery 11 is connected to the ground. The other end of the switch SW1 is connected to the anode terminal of a diode D1. By closing this switch SW1, the electrical power of the battery 11 is supplied to the step-up chopper circuit 12. Note that the claimed invention can also be carried out by changing the battery 11 with, for example, a primary battery, without including the charging circuit 14 to be described later.

The step-up chopper circuit 12 serving as a "power inverter circuit" is a publicly-known step-up circuit used to raise and invert the voltage of the battery 11 to a certain voltage. The "power inverter circuit" may alternatively be, for example, a publicly-known step-down chopper circuit or step-up/down chopper circuit. Yet alternatively, the power inverter circuit may be, for example, a publicly-known inverter circuit for inverting the DC power of the battery 11 to AC power according to the specifications of the server 30 or the like.

The step-up chopper circuit 12 includes a coil L1, a switch SW2, a diode D3, and a switching controller 15.

One end of the coil L1 is connected to the cathode terminal of the diode D1 and the other end of the coil L1 is connected to the anode terminal of the diode D3 and one end of the switch SW2. The cathode terminal of the diode D3 is connected to the anode terminal of a diode D4, and the cathode terminal of the diode D4 is connected to the output terminal 17. The other end of the switch SW2 is connected to the ground. The switch SW2 is, for example, a semiconductor switching element, such as a transistor or an FET (field effect transistor). The switching controller 15 serving as a "voltage regulator" undertakes the on/off-control of the switch SW2 to adjust the duty ratio thereof, thereby performing control for maintaining the output voltage of the step-up chopper circuit 12 at a constant level. More specifically, the switching controller 15 performs the on/off-control of the switch SW2 to adjust the output voltage, so that a reference voltage V1 to be described later equals a predetermined voltage.

The voltage control circuit 13 includes a first resistor R1, a second resistor R2, a third resistor R3, a switch SW3 and a voltage controller 16.

The first resistor R1 and the second resistor R2 constitute a voltage-dividing circuit for dividing the output voltage of the step-up chopper circuit 12. The third resistor R3 is connected in parallel with the second resistor R2. The switch SW3 is, for example, a semiconductor switching element, such as a transistor or an FET, used to cut off the parallel connection of the third resistor R3 with the second resistor R2. The voltage controller 16 is, for example, a publicly-known microcomputer control device used to perform the open/close-control of the switch SW3 on the basis of a power failure detection signal PWOK output by the ATX power supply 20.

More specifically, one end of the first resistor R1 is connected to the cathode terminal of the diode D3 and the other end of the first resistor R1 is connected to one end of the resistor R2. The other end of the second resistor R2 is connected to the ground. One end of the third resistor R3 is connected to the connection point between the first resistor R1 and the second resistor R2, and the other end of the third resistor R3 is connected to one end of the switch SW3. The other end of the switch SW3 is connected to the ground. The connection point between the first resistor R1 and the second resistor R2 is connected to the switching controller 15 of the step-up chopper circuit 12. The voltage of this connection point serves as the reference voltage V1 of the step-up chopper circuit 12.

The charging circuit 14 is used to charge the battery 11 with the electrical power of the ATX power supply 20. More specifically, the charging circuit 14 is connected to the output terminal 17, and part of electrical power output by the ATX power supply 20 is supplied to the charging circuit 14 through the output terminal 17. In addition, the charging circuit 14 is connected to one end of the switch SW4, and the other end of the switch SW4 is connected to the positive electrode of the battery 11. The switch SW4 is, for example, a semiconductor switching element, such as a transistor or an FET. The battery 11 is charged by closing this switch SW4. The charging circuit 14 open/close-controls the switch SW4 on the basis of the charged state of the battery 11. The charging circuit 14 is further connected to the anode terminal of the diode D2, and the cathode terminal of the diode D2 is connected to the cathode terminal of the diode D1.

As described above, the UPS 10 is preferably provided with the charging circuit 14 for charging the battery 11 with the electrical power of the ATX power supply 20. Consequently, the battery 11 can be maintained in a charged state ready to supply an adequate amount of electrical power at the time of an instantaneous power failure. It is therefore possible to prevent such a situation that the UPS 10 fails to supply an adequate amount of electrical power from the battery 11 at the time of an instantaneous power failure, and therefore, the voltage of electrical power supplied to the server 30 drops temporarily.

<Operation of UPS 10>

Figure 2:
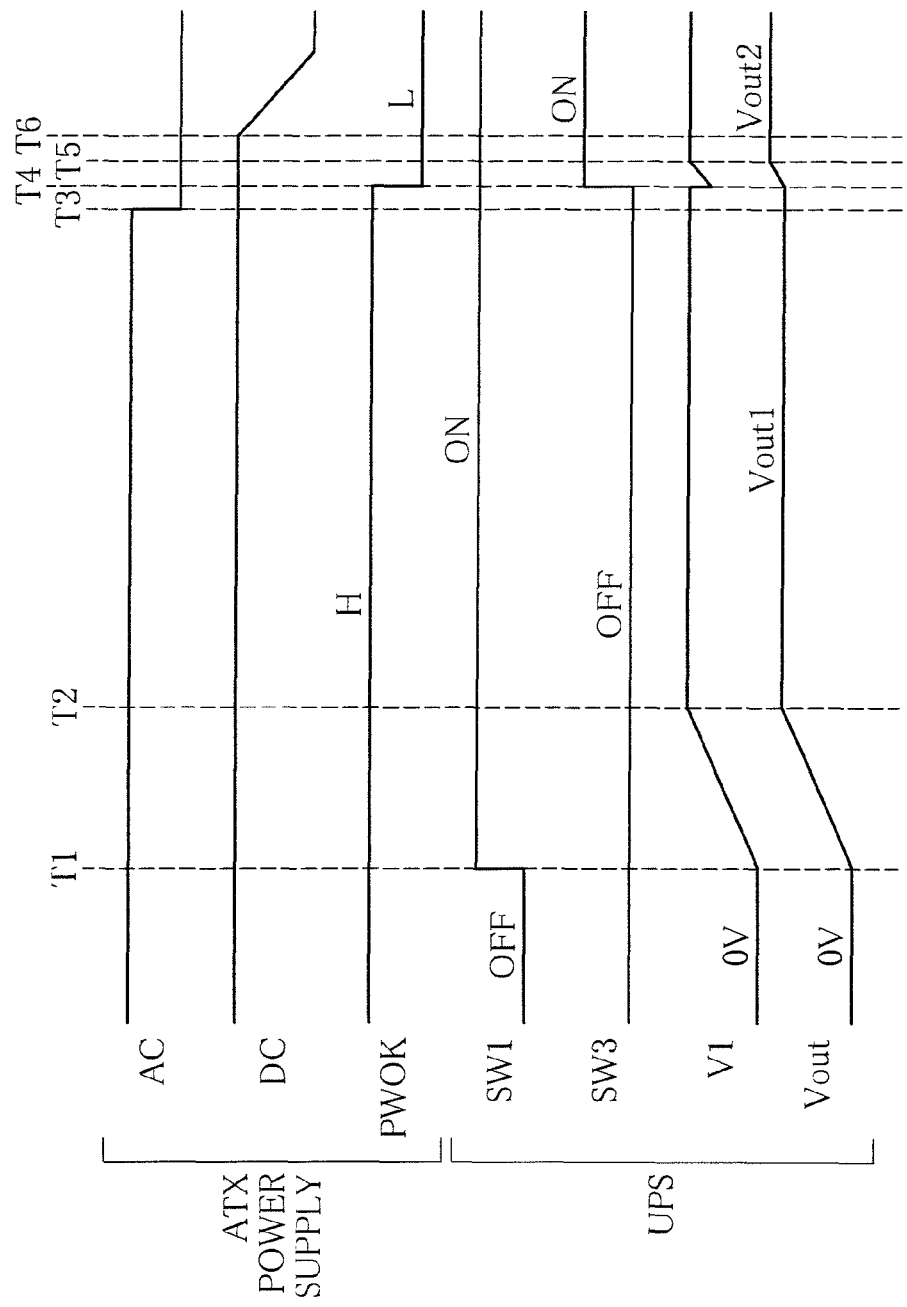
FIG. 2 is a timing chart illustrating the operation of an UPS and an ATX power supply.

The operation of the UPS 10 will be described while referring to FIG. 2. FIG. 2 is a timing chart illustrating the operation of the UPS 10 and the ATX power supply 20.

The UPS 10 is operative so that the step-up chopper circuit 12 starts voltage boosting as the result of the switch SW1 being placed in a closed state (ON) (timing T1). Consequently, the reference voltage V1 rises to a predetermined voltage, and the output voltage Vout (voltage of the output terminal 17) of the step-up chopper circuit 12 rises from 0 V to a standby voltage Vout1 (timing T2). The standby voltage Vout1 is lower than a rated voltage Vout2. For example, in the present embodiment, the rated voltage Vout2 is 12 V, whereas the standby voltage Vout1 is set to a voltage of approximately 10.9 V which is nearly 90% of the rated voltage. Under the condition of the power failure detection signal PWOK being not output from the ATX power supply 20 (the power failure detection signal PWOK is in a high (H) level), the output voltage Vout of the step-up chopper circuit 12 is maintained at the standby voltage Vout1. Note that a time period of approximately 5 ms is taken for the output voltage Vout of the step-up chopper circuit 12 to rise from 0 V to the standby voltage Vout1 (timing T2) from the time the switch SW1 is closed (timing T1).

If an instantaneous power failure occurs in the commercial power source and supply of alternating-current power AC to the ATX power supply 20 stops (timing T3), the power failure detection signal PWOK of the ATX power supply 20 changes from a high (H) level to a low (L) level in approximately 12 ms at the minimum from the time supply of electrical power to the ATX power supply 20 stops (timing T4). Then, the direct-current voltage output DC of the ATX power supply 20 begins to drop in approximately 13 ms at the minimum from the time supply of electrical power to the ATX power supply 20 stops (timing T6). That is, in the ATX power supply 20, the time difference from the time the power failure detection signal PWOK changes to a low (L) level to the time the voltage of the direct-current voltage output DC begins to drop is only approximately 1 ms.

The UPS 10 places the SW3 in a closed state (ON) at the timing when the power failure detection signal PWOK changes from a high (H) level to a low (L) level (timing T4). At the moment the SW3 is closed, the third resistor R3 is connected in parallel with the second resistor R2. Consequently, a voltage dividing ratio changes and the reference voltage V1 becomes lower than the predetermined voltage (timing T4).

When the reference voltage V1 becomes lower than the predetermined voltage, the switching controller 15 of the step-up chopper circuit 12 adjusts the duty ratio of a control signal applied to the switch SW2, so that the reference voltage V1 equals the predetermined voltage. Consequently, the output voltage Vout of the step-up chopper circuit 12 rises from the standby voltage Vout1 to the rated voltage Vout2 (timing T5). That is, under the condition of the power failure detection signal PWOK being output from the ATX power supply 20 (the power failure detection signal PWOK is in a low (L) level), the output voltage Vout of the step-up chopper circuit 12 equals the rated voltage Vout2.

This time period from the time the switch SW3 is closed (timing T4) to the time the output voltage Vout of the step-up chopper circuit 12 rises to the rated voltage Vout2(timing T5) is approximately 0.5 ms. This time lag is shorter than the time difference of 1 ms from the time the power failure detection signal PWOK changes to a low (L) level to the time the voltage of the direct-current voltage output DC begins to drop. This means that if an instantaneous power failure occurs and the power failure detection signal PWOK of the ATX power supply 20 changes to a low (L) level, the UPS 10 can set the output voltage of the step-up chopper circuit 12 to the rated voltage Vout2(12 V DC) before the voltage of the direct-current voltage output DC of the ATX power supply 20 begins to drop. Accordingly, there hardly arises the possibility that in the UPS 10, the voltage of electrical power supplied to the server 30 drops temporarily at the time of an instantaneous power failure in the commercial power source.

As described above, the UPS 10 according to the present invention maintains the output voltage Vout of the step-up chopper circuit 12 at the standby voltage Vout1 lower than the rated voltage under the condition of the power failure detection signal PWOK being not output from the ATX power supply 20. When the power failure detection signal PWOK is output from the ATX power supply 20, the UPS 10 controls the step-up chopper circuit 12, so that the output voltage Vout thereof equals the rated voltage Vout2. Consequently, it is possible to greatly reduce the time difference from the time the power failure detection signal PWOK is detected to the time the UPS 10 is ready to supply electrical power having the rated voltage Vout2. Accordingly, it is possible to reduce the possibility of the voltage of electrical power supplied to the server 30 dropping temporarily at the time of an instantaneous power failure in the commercial power source and realize seamless backup by the voltage control circuit 13 having an extremely simple configuration, without having to provide any expensive power failure detector.

In addition, the UPS 10 maintains the output voltage Vout of the step-up chopper circuit 12 at the standby voltage Vout1 lower than the rated voltage Vout2 during standby. For this reason, the electrical power of the battery 11 of the UPS 10 is hardly consumed at all during the time electrical power is supplied from the ATX power supply 20 to the server 30. Accordingly, there arises no such a situation that the electrical power of the battery 11 is consumed during standby, thus failing to meet the essential requirement of supplying electrical power from the UPS 10 to the server 30 at the time of an instantaneous power failure.

Thus, according to the present invention, it is possible to provide the UPS 10, at low cost, in which the voltage of electrical power supplied to electronic equipment, such as the server 30, is less likely to drop temporarily at the time of an instantaneous power failure in the commercial power source.

In addition, the voltage control circuit 13 is configured so that the output voltage Vout of the step-up chopper circuit 12 can be raised from the standby voltage Vout1 to the rated voltage Vout2 simply by closing the switch SW3 to connect the third resistor R3 in parallel with the second resistor R2. Consequently, the output voltage Vout of the step-up chopper circuit 12 can be raised to the rated voltage Vout2 in a shorter period of time from the point in time when the power failure detection signal PWOK is output from the ATX power supply 20. Thus, it is possible to further reduce the possibility of the voltage of electrical power supplied to the server 30 dropping temporarily at the time of an instantaneous power failure in the commercial power source.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An uninterruptible DC power supply comprising:
   a battery;
   a DC-DC converter for converting electrical power of the battery; and
   a voltage control circuit for controlling the DC-DC converter, so that output voltage of the DC-DC converter is maintained at a standby voltage lower than a rated voltage under a condition of a power failure detection signal being not output from an external power supply and the output voltage of the DC-DC converter equals the rated voltage under a condition of the power failure detection signal being output from the external power supply, wherein
   the voltage control circuit includes a first resistor and a second resistor for dividing the output voltage of the DC-DC converter; a third resistor connected in parallel with the second resistor; a switch for cutting off the parallel connection of the third resistor with the second resistor; and a voltage controller for controlling the switch on a basis of the power failure detection signal, and the DC-DC converter includes a voltage regulator for regulating the output voltage, so that voltage of the connection point between the first resistor and the second resistor equals a predetermined voltage.

2. The uninterruptible DC power supply according to claim 1, further comprising a charging circuit for charging the battery with electrical power of the external power supply.

\* \* \* \* \*